R. P. JACKSON.
COIL WEDGE FOR DYNAMO ELECTRIC MACHINES.
APPLICATION FILED JAN. 2, 1915.
1,260,674.
Patented Mar. 26, 1918.
Fig. 1.
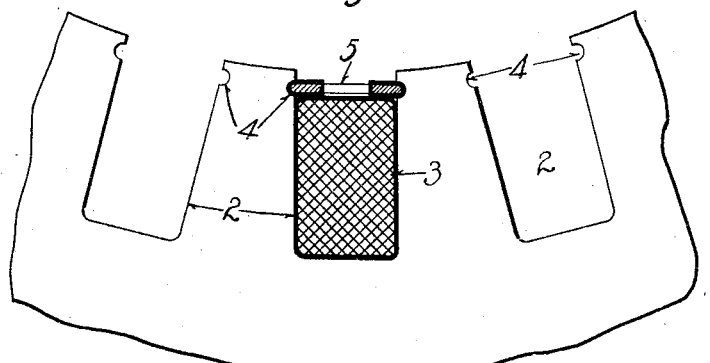
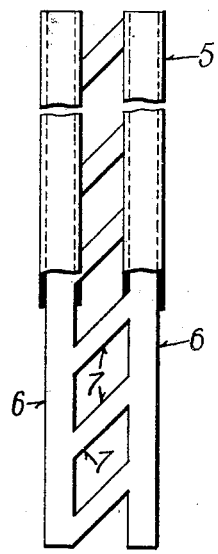
Fig. 2.
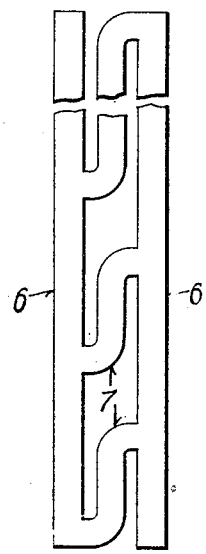
Fig. 3.
WITNESSES:
R. J. Fitzgerald
O. W. Kennedy
INVENTOR
Ray P. Jackson.
BY
Wesley G. Carr
ATTORNEY

UNITED STATES PATENT OFFICE.

RAY P. JACKSON, OF EDGEWOOD PARK, PENNSYLVANIA, ASSIGNOR TO WESTINGHOUSE ELECTRIC AND MANUFACTURING COMPANY, A CORPORATION OF PENNSYLVANIA.

COIL-WEDGE FOR DYNAMO-ELECTRIC MACHINES.

1,260,674.     Specification of Letters Patent.     Patented Mar. 26, 1918.

Application filed January 2, 1915. Serial No. 94.

*To all whom it may concern:*

Be it known that I, RAY P. JACKSON, a citizen of the United States, and a resident of Edgewood Park, in the county of Allegheny and State of Pennsylvania, have invented a new and useful Improvement in Coil-Wedges for Dynamo-Electric Machines, of which the following is a specification.

My invention relates to dynamo-electric machines, and it has particular reference to coil-retaining means adapted to be used in the coil-containing slots of dynamo-electric machines.

The object of my invention is to provide a coil-retaining wedge of magnetic material that shall be simple and inexpensive to construct and that may be readily applied to dynamo-electric machines provided with open slots, and, by its use, secure the well known advantages of partially closed slots.

Magnetic wedges of the type indicated, as heretofore constructed, are so made that metal bridges extend across the wedges at right angles to the sides of central slots. Such a form of wedge is rigid and non-yielding and, when applied to a coil-retaining slot, must depend upon friction alone to retain it therein. For this reason, any unequal expansion or contraction of adjacent parts, due to unequal heating or unequal distribution of magnetic material causes the wedge to loosen and slip out of the slot. This effect may be overcome by the use of a hard-setting cement to hold the wedges in place. Then, however, a second disadvantage is encountered for the reason that, when it is necessary to make any repairs, it is practically impossible to remove the wedge without damaging it or the coils contained in the slot. Consequently, the advantage obtainable by an open-slot construction for facilitating repairs is lost.

By my invention, I propose to provide a magnetic wedge that may be readily inserted within, or removed from, an open slot and that will possess sufficient inherent resiliency to remain firmly within the slot, regardless of any expansion or contraction of adjacent parts and without the use of any binding agent. To accomplish this result, the wedge is formed of any suitable magnetic material having resilient qualities and is constructed with diagonal cross pieces so shaped and placed as to make the wedge yielding to transverse pressure when inserted in the slot.

In the accompanying drawing, Figure 1 is a transverse sectional view of a portion of the stator of a dynamo-electric machine embodying my invention; Fig. 2 is a plan view of a wedge constructed in accordance with my invention, and Fig. 3 is a plan view of a modification of the wedge.

A core member 1 of a dynamo-electric machine is provided with slots 2 adapted to contain conductors, such as coils 3, the teeth forming the slots being provided with oppositely disposed grooves 4 near their outer ends. Wedges 5 fit into the grooves 4 and serve to retain the coils 3 within the slots 2. As best shown in Figs. 2 and 3 each of the wedges consists of parallel side portions 6 connected at points that are diagonally disposed by cross pieces 7. The wedges are preferably formed from sheets of suitable magnetic material having resilient properties, such as cold rolled steel, by punching or stamping. It is to be understood that the wedge may be formed in any other suitable manner so that the side portions 6 are always resiliently connected with relation to each other. Insulation of the wedge is provided for by covering the parallel side portions thereof with any suitable insulating enamel or by dipping the entire wedge in such enamel.

In order to apply the wedge, the parallel side portions 6 are made to approach each other by application of transverse pressure and a portion of the wedge may then be inserted within the slot, after which the remainder thereof is driven into the slot. It is apparent that the wedge will remain fixed within the slot by reason of its resiliency. The wedge may be as easily removed from the slot by first forcing out a small portion of one end thereof and then applying transverse pressure, as explained above, at successive points adjacent to the face of the core member.

While I have shown my invention in a simple and preferred form, it is not so limited but is capable of various modifications within the scope of the appended claims.

I claim as my invention:

1. A coil-retaining means for a dynamo-electric machine comprising continuous parallel members connected at non-adjacent points and capable of simultaneously yielding to transverse pressure throughout their length.

2. A coil-retaining means for a dynamo-electric machine comprising a pair of continuous parallel side members resiliently connected at diagonally disposed points, by a plurality of cross pieces.

3. A coil-retaining means for a dynamo-electric machine comprising a pair of continuous parallel side members resiliently connected by a plurality of cross pieces diagonally disposed with relation to said side members.

4. A coil-retaining wedge of punched magnetic material comprising a pair of continuous parallel side members resiliently connected, at diagonally disposed points, by a plurality of cross pieces and capable of yielding to transverse pressure.

In testimony whereof, I have hereunto subscribed my name this 23rd day of Dec. 1914.

RAY P. JACKSON.

Witnesses:
GOLDIE E. McGEE,
B. B. HINES.

Copies of this patent may be obtained for five cents each, by addressing the "Commissioner of Patents, Washington, D. C."